(12) United States Patent
Harrison

(10) Patent No.: US 8,059,111 B2
(45) Date of Patent: Nov. 15, 2011

(54) DATA TRANSFER USING HAND-HELD DEVICE

(75) Inventor: Phil Harrison, London (GB)

(73) Assignee: Sony Computer Entertainment America LLC, Foster City, CA (US)

( * ) Notice: Subject to any disclaimer, the term of this patent is extended or adjusted under 35 U.S.C. 154(b) by 968 days.

(21) Appl. No.: 12/017,294

(22) Filed: Jan. 21, 2008

(65) Prior Publication Data

US 2008/0152263 A1    Jun. 26, 2008

(51) Int. Cl.
*G09G 5/00*    (2006.01)
(52) U.S. Cl. ......... 345/204; 345/169; 345/212; 345/214
(58) Field of Classification Search .................. 345/169, 345/173–179, 204–215
See application file for complete search history.

(56) References Cited

U.S. PATENT DOCUMENTS

| | | | | |
|---|---|---|---|---|
| 7,884,805 | B2* | 2/2011 | Thorn | 345/173 |
| 2003/0229900 | A1* | 12/2003 | Reisman | 725/87 |
| 2007/0146347 | A1* | 6/2007 | Rosenberg | 345/173 |
| 2008/0259042 | A1* | 10/2008 | Thorn | 345/173 |
| 2009/0140986 | A1* | 6/2009 | Karkkainen et al. | 345/173 |
| 2009/0198359 | A1* | 8/2009 | Chaudhri | 700/94 |

* cited by examiner

*Primary Examiner* — Vijay Shankar
(74) *Attorney, Agent, or Firm* — Joshua D. Isenberg; JDI Patent

(57) ABSTRACT

A hand-held electronic device and data transfer method are disclosed. The device may comprise a case, a processor and a memory. A case motion sensor and a remote device detector may be coupled to the processor. A communication interface may be coupled to the memory and processor. The processor may be programmed with instructions that, when executed cause the device to recognize a remote device, recognize a gesture from resulting from motion of the case, and transfer data from the hand-held device to the remote device or vice versa in response to recognition of the gesture. Alternatively, the instructions may cause the device to identify data to be transferred from a source to a destination, identify the source and/or destination, recognize a gesture resulting from motion of the case, and transfer the data from the source to the destination in response to recognition of the gesture.

32 Claims, 5 Drawing Sheets

DATA TRANSFER USING HAND-HELD DEVICE

FIELD OF THE INVENTION

Embodiments of the present invention are related to hand-held devices and more particularly to data transfer with hand-held devices.

BACKGROUND OF THE INVENTION

Electronic devices are increasingly becoming connected to each other over networks, such as the Internet. The use of hand-held electronic devices with network capability has also become quite widespread. Cell phones, personal digital assistants (PDAs), portable email devices, and hand-held game devices are but a few of many examples of hand-held electronic devices that can generate, store and transfer data wirelessly over a network. Although connectivity of these devices has increased, the process of transferring files from one device to another tends to remain somewhat awkward.

For example, for devices connected over a local area network (LAN), a user can look up a destination for a file using a browser or menu on one of the networked devices. The file can then be transferred using a "drag" and "drop" operation with a "mouse" or a series of keyboard commands, or commands selected from a menu. The file-transfer instruction sequence does not depend on how physically close the source and destination devices are with respect to each other. This can make a transfer of a file, say, from a portable email device to a nearby laptop computer, needlessly complicated.

It would be desirable, therefore, to make file transfer between nearby devices less complicated and more intuitive.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
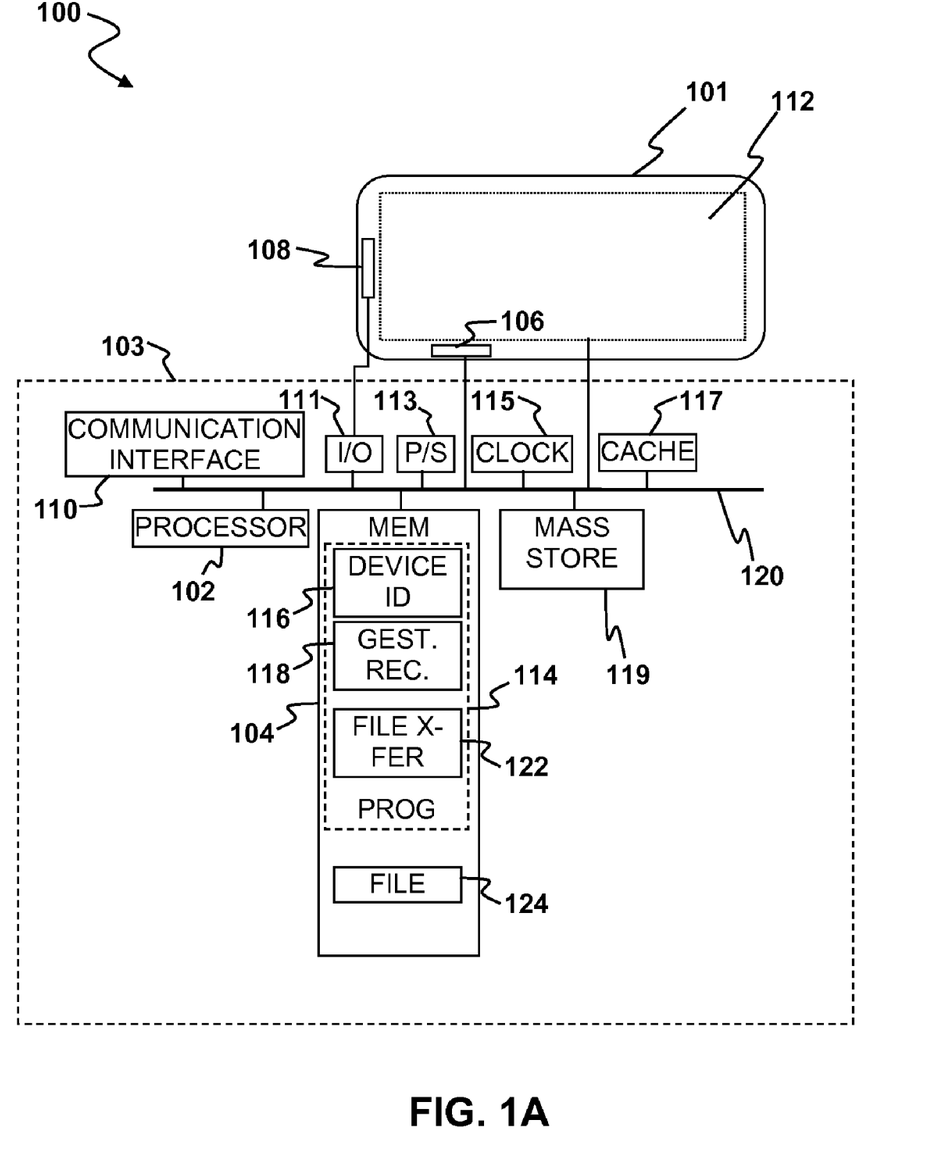
FIG. 1A is a block diagram of a hand-held device according to an embodiment of the present invention.

According to an embodiment of the invention, a shown in FIG. 1A, a hand-held electronic device 100 includes a case 101. The device may include a controller 103, the components of which may be located within the case 101. The controller 103 may include a processor 102 and a memory 104. In some embodiments, the device 100 may include multiple processors 102 if parallel processing is to be implemented. By way of example, the device 100 may be configured for use as a game device, a phone, a portable media player, an email device, web browser device and the like. The hand-held device 100 may further include a memory 104 (e.g., RAM, DRAM, ROM, and the like). The device 100 further includes a case motion sensor 106 coupled to the processor 102 and a remote device detector 108 coupled to the processor 102. A communication interface 110 may be coupled to the processor 102 and memory 104.

The device 100 may include a display screen 112 disposed on a major surface of the case 101 and operably coupled to the processor 102. Furthermore, it is noted that in certain embodiments of the invention the device 100 may include two display screens located on opposite faces of the case 101. By way of example, the display screen 112 may be a flat panel screen, e.g., a liquid crystal display (LCD) array. In some embodiments, the display 112 may be a touch screen, which may be based on any suitable touch screen technology, such as resistive, surface-acoustic wave (SAW) capacitive, infrared, strain gauge, optical imaging, dispersive signal technology, acoustic pulse recognition, frustrated total internal reflection or graphics tablet based on magneto-strictive technology to locate the tip of a stylus. By way of example a resistive touch screen panel may be composed of several layers including two thin metallic electrically conductive and resistive layers separated by thin space. When some object touches this kind of touch panel, the layers are connected at certain point. The panel then electrically acts similar to two voltage dividers with connected outputs. This causes a change in the electrical current which is registered as a touch event which may be sent to the processor 102 for processing.

The memory 104 may store program instructions 114 for execution on the processor 102. The program instructions 114 may be configured to respond to inputs from one or more input sources on the device (e.g., the case motion sensor 106 or device detector 108) or conventional inputs such as buttons, a joystick, and the like. In addition, the program instructions 114 may receive input from the display screen 112, e.g., in the case where the display screen 112 is a touch screen.

The hand-held device 100 may also include well-known support functions, such as input/output (I/O) elements 111, power supplies (P/S) 113, a clock (CLK) 115 and cache 117. The device 100 may optionally include a mass storage device 119 such as a disk drive, CD-ROM drive, flash drive, or the like to store programs and/or data. The processor 102, digital memory 104, case motion sensor 106, remote device detector 108 and other components of the device 100 may exchange signals (e.g., code instructions and data) with each other via a system bus 120 as shown in FIG. 1A.

The program instructions 114 may include a subset of device recognition instructions 116 that when executed cause the device 100 to recognize a remote device 130 from a signal generated by the remote device detector 108. In addition, the instructions 114 may include another subset of gesture recognition instructions 118 that, when executed, cause the device 100 to recognize a gesture from a signal generated by the case motion sensor 106 as a result of motion of the case 101. Furthermore, the instructions 114 may include a subset of file transfer instructions 122 that, when executed transfer a file in response to recognition of the gesture.

The case motion sensor 106 may be based on any suitable signal for tracking the position and/or orientation of the case. Examples of suitable devices for case motion tracking include inertial sensors such as accelerometers and tilt sensors, acoustic sensors such as a combination of a sound source and microphone array, optical sensors such as a video camera. It is noted that case motion sensor may be mounted to the case, but it need not be. For example, the case motion sensor may include a remote video camera and a light source mounted to the case. In the case of acoustic-based motion tracking, a sound source may be mounted to the case and a microphone array may be remotely located or vice versa. Motion of the case 101 may be tracked in any suitable fashion, by way of example, and without loss of generality, if the case motion sensor is a 6-axis accelerometer, motion of the case may be tracked by obtaining signals corresponding to translational acceleration along orthogonal x, y and z axes and rotation about each of these axes. Acceleration signals may be integrated once to determine change in velocity and a second time to determine displacement.

The remote device detector 108 is generally configured to facilitate detection of one or more remote devices 130 that are in the vicinity of the hand-held device 100. The remote device 130 may be any suitable electronic device, e.g., a personal computer, laptop, game console, television, digital picture frame, and the like. The remote device detector 108 may facilitate selection of a particular remote device as a source or destination for file transfer. Remote device detection may be based on any suitable technology. By way of example, and without loss of generality, the remote device detector 108 may be configured to identify a remote device 130 that is within a line of sight of the hand-held device and within reasonably close proximity, e.g., within the same room using a unique identifier associated with the remote device 130. There are a number of possible schemes for implementing such a function. By way of example, each remote device may be fitted with a unique radiofrequency identification (RFID) tag and the remote device detector 108 may include an RFID tag reader. Alternatively, the remote device may be fitted with a unique bar code and the device detector 108 may include a bar code reader. In other embodiments, the remote device detector 108 may include a video camera configured to recognize either the remote device or a marker placed on the remote device. In still other embodiments, the remote device and remote device detector 108 may be configured to communicate via a wireless communication link, e.g., an optical, infrared, or radiofrequency link.

The communication interface 110 may be configured to facilitate transfer of data, e.g., in the form of one or more files 124. The files 124 may be stored in the memory 104 or may be stored on a remote device 130 shown in FIGS. 1B-1C. In certain embodiments, the communication interface 110 may be used during transfer of files 124 from the memory 104 to the remote device 130 or vice versa. By way of example, the communication interface may facilitate communication between the device 100 and remote device 130 via a network. By way of example, the network may be a wireless network implemented, e.g., using the communication interface 110, a wireless router 132 and a communication link 135 affiliated with the remote device 130. Alternatively, the communication interface 110 and communication link 135 may facilitate direct communication with the remote device 130, e.g., by a direct link 137, e.g., an optical or infrared link, a radiofrequency link, such as Bluetooth®, or other wireless link. It is noted that in some embodiments, the communication interface 110 may implement or facilitate function of the remote device detector 108. It is further noted that in some embodiments there may be overlap between the functions of the case motion sensor 106 and the remote device detector 108 and communication interface 110. For example, an infrared-based transceiver may be used to track the motion of the case 101 and to provide a wireless link for communication. Similarly, a video camera may serve to track motion of the case and to identify remote devices.

Figure 1B:
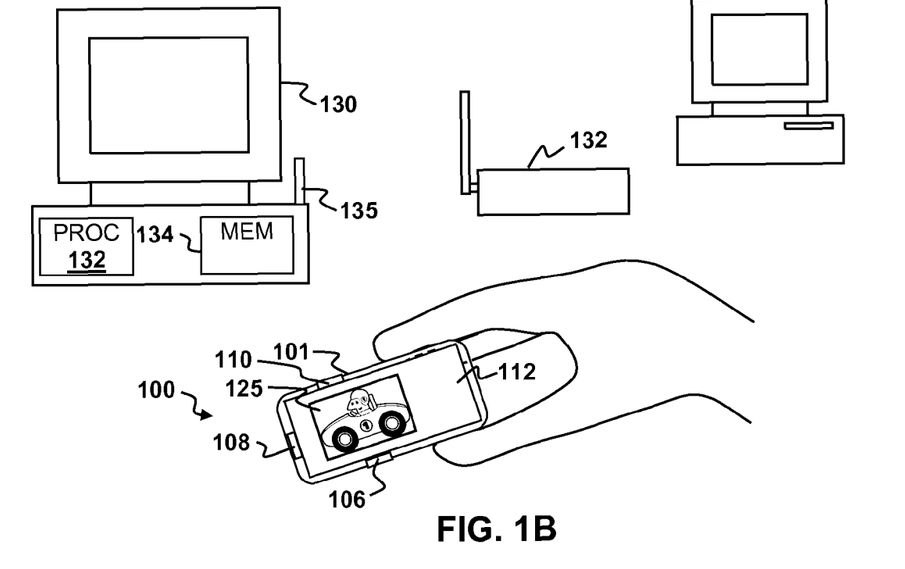
FIGS. 1B-1C are schematic diagrams illustrating file transfer with a hand-held electronic device according to an embodiment of the present invention.
Figure 1C:
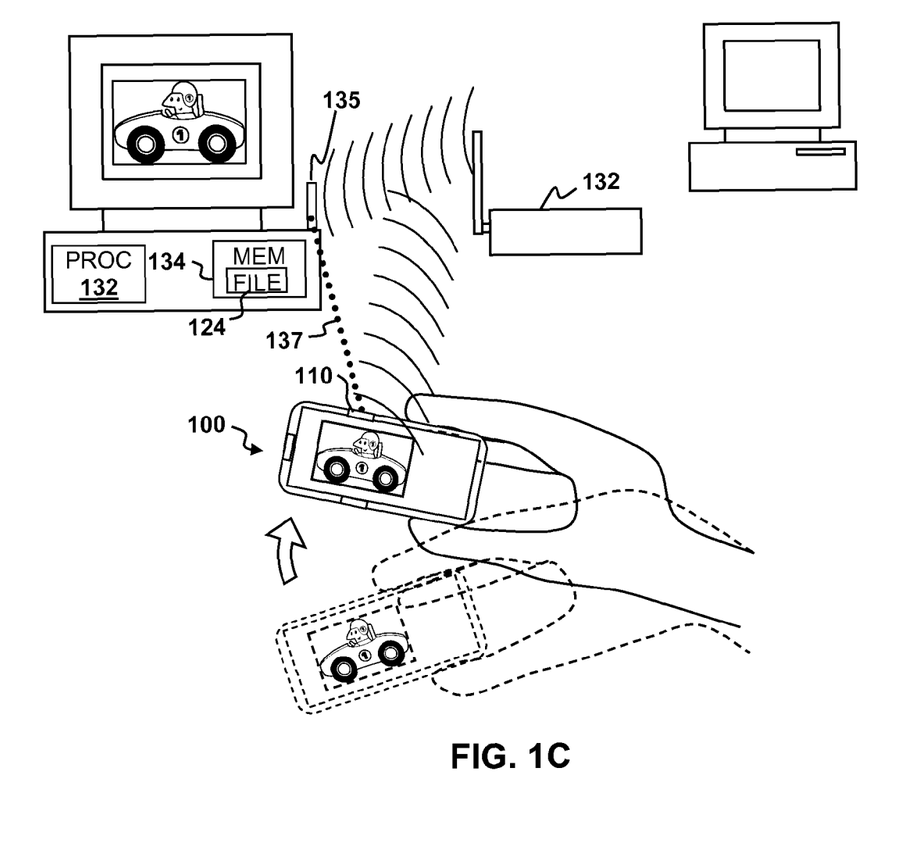

File transfer in accordance with an embodiment of the present invention may be understood with reference to FIG. 1A, FIG. 1B, FIG. 1C and FIG. 2. FIGS. 1B-1C show a user holding the hand-held device 100 and transferring a data file to a nearby remote electronic device 130 by performing a gesture with the hand-held device 100. By way of example, file information 124 may be stored in the memory 104 of the hand-held device 100. The file information 124 may include an entire data file. Alternatively, the file information may include a file address of some remote location, e.g., a server associated with a website. The remote device 130 may include a unique identifier 130, such as an RFID tag, bar code, etc. that allows the remote device detector 108 to generate a signal for detecting and identifying the remote device 130. The remote device 130 may also include a processor 134 and memory 136. Both the hand-held device 100 and electronic device 130 may be programmed with code instructions for communicating over a network such as a local area network.

Figure 2:
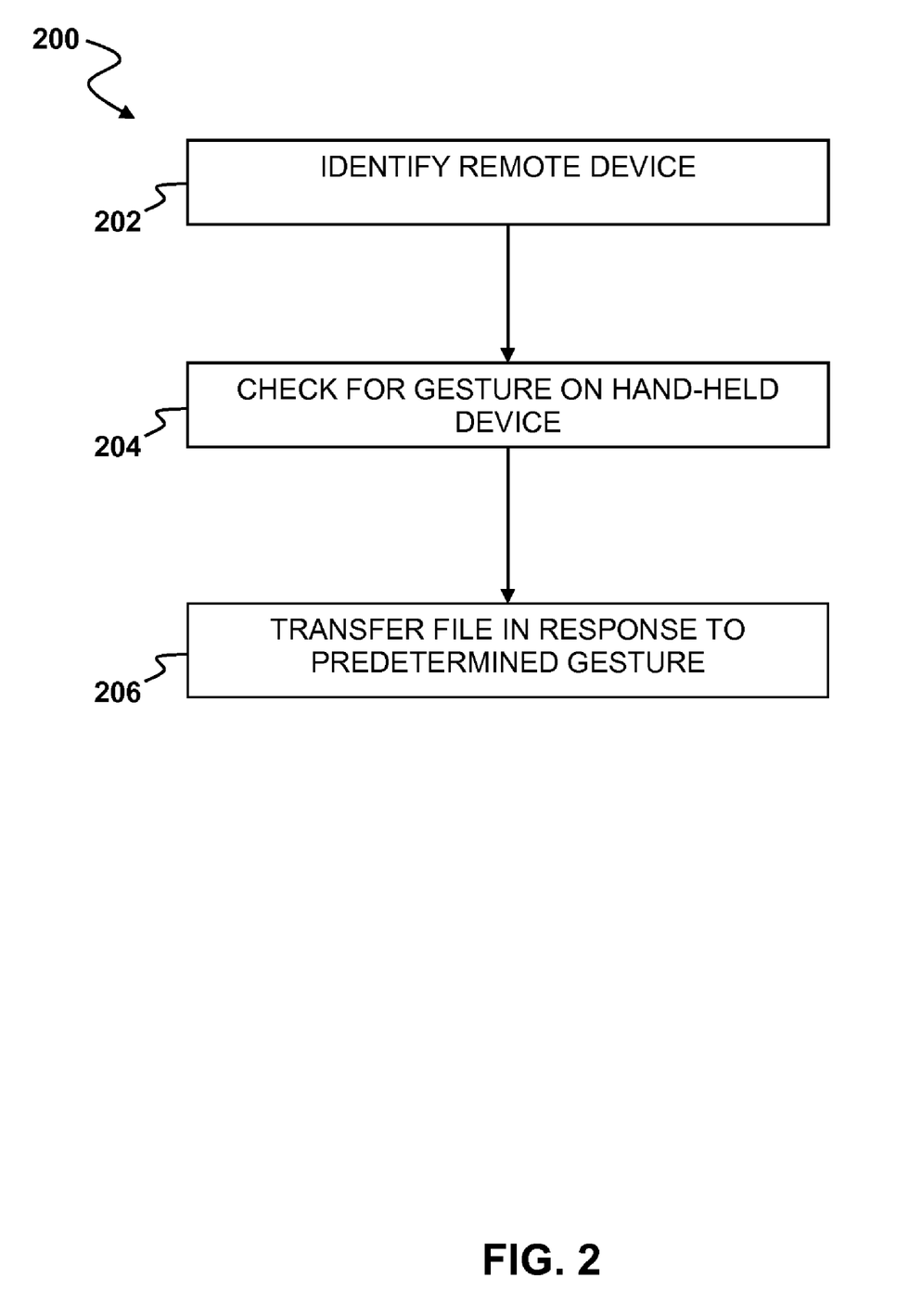
FIG. 2 is a flow diagram illustrating a method of file transfer with a hand-held device according to an embodiment of the present invention.

The flow diagram in FIG. 2 depicts an example of a file transfer method 200 that may be implemented using the device 100. Such a method may be implemented, in whole or in part through execution of the program instructions 114. Specifically, as indicated at 202 a remote device 130 may be identified from a signal generated by the remote device detector 108. The remote device 130 may be one of a plurality of remote devices in the vicinity of the hand-held device 100. The device identification instructions 115 may be configured identify the remote device 130 from among a plurality of remote devices based on one or more remote device selection criteria. There are a number of different techniques for implementing device identification at 202. These techniques generally involve generating a signal with the remote device detector 108 in response to some stimulus uniquely associated with the remote device 130. Examples of such a stimulus may be based on bar code reading, image identification, RFID or direct wireless communication, as discussed above.

The device 100 may recognize a gesture from a signal generated by the case motion sensor as a result of motion of the case 101 as indicated at 204. A file 124 may then be transferred from the memory 104 of the hand-held device 100 to the memory 134 of the remote device 130 or vice versa in response to recognition of the gesture as indicated at 206. By way of example, once the file and destination have been identified the transfer of the file 124 may be triggered by making a flicking motion with the hand-held device 100. In some embodiments, the gesture recognition instructions 116 may be configured to determine a direction of the flicking motion and select the remote device 130 from among a plurality of remote devices using a direction of the flicking motion. Thus, triggering of the file transfer and selection of the destination device may be combined into a single operation.

Gesture recognition at 204 may be implemented in any of a number of ways. For example, a gesture may be detected using sample motion data from the case motion sensor. An energy value and a baseline value may be computed. The baseline value may be updated if the energy value is below a calm energy threshold. The sample motion data may be adjusted based on the updated baseline value. A local variance may be calculated over a predetermined number of samples.

Sample motion data values may be recorded if the local variance exceeds a threshold. Sample motion data recording may stop if a local variance scalar value falls below a drop threshold. Input Gestures may be recognized by computing a total variance for sample values in an Input Gesture; calculating a figure of merit using sample values from the Input Gesture and one or more Catalog Gestures; and determining whether the Input Gesture matches a Catalog Gesture from the figure of merit. Further details of such gesture recognition are described, e.g., in commonly assigned U.S. Provisional Patent Application No. 61/020,669 to Thomas Miller IV, entitled GESTURE CATALOGING AND RECOGNITION, filed Jan. 11, 2008, which is incorporated herein by reference.

There are a number of different ways of implementing the file transfer indicated at 206. For example, suppose the file 124 is to be transferred from the hand-held device memory 104 to the remote device memory 134. Once the remote device 130 has been identified at 202 the file transfer instructions 122 may use a default memory location in the remote device memory 134 as a destination for the file. The file 124 may be transferred, e.g., copied or moved, using conventional file transfer routine involving the communication interface 110. For example, the communication interface 110 may be a network interface, such as a wireless Ethernet card. The remote device 130 may be configured with a similar wireless network interface 138. Both the hand-held device 110 and remote device 130 may exchange files via a wireless router 132. Once the file and destination have been identified the transfer of the file 124 via the router 132 may be triggered by making a flicking motion with the hand-held device 100. Alternatively, the file may be transferred by direct link between the hand-held device 100 and remote device 130 in the absence of a network. Such file transfer may be accomplished, e.g., by wireless link, such as an optical, infrared or radiofrequency (e.g., BlueTooth®) link.

According to an alternative embodiment of the invention, files may be identified for transfer and source and destination devices may be identified and then the file may be transferred with the hand-held device by gesturing with the case from the hand-held device. In such embodiments, the hand-held device 100 may be the source device or the destination device or neither the source nor destination. For example, the file may be transferred from the hand-held device (acting as the source) to a remote destination device, e.g., as shown in FIGS. 1B-1C. Alternatively, the file may be transferred from a remote source device to the hand-held device (acting as the destination). This latter case is essentially the reverse of the situation shown in FIGS. 1B-1C. In yet another example, the file may be transferred from one remote device to another remote device using the hand-held device to select the source and destination devices and trigger the transfer. An example of such an embodiment may be implemented as illustrated in FIG. 3 and FIGS. 4A-4B.

Figure 3:
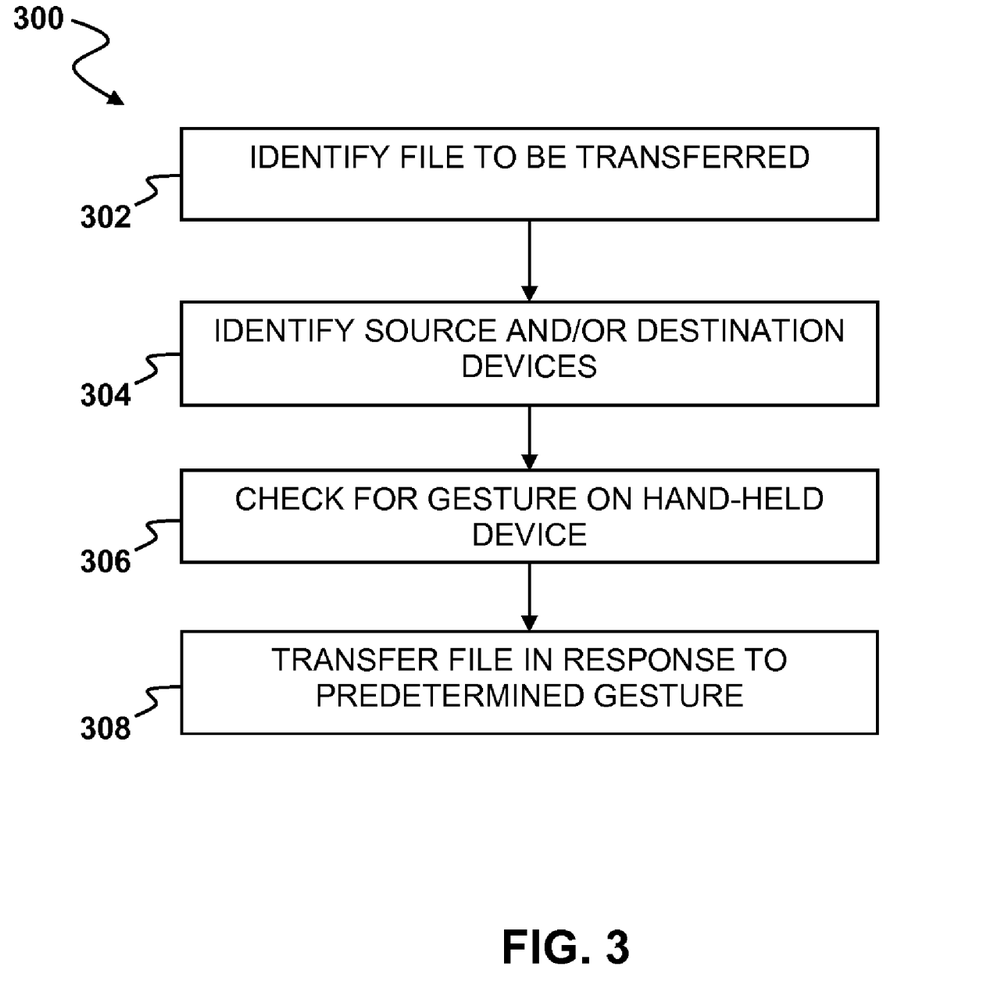
FIG. 3 is a flow diagram illustrating a method of file transfer with a hand-held device according to an embodiment of the present invention.
Figure 4A:
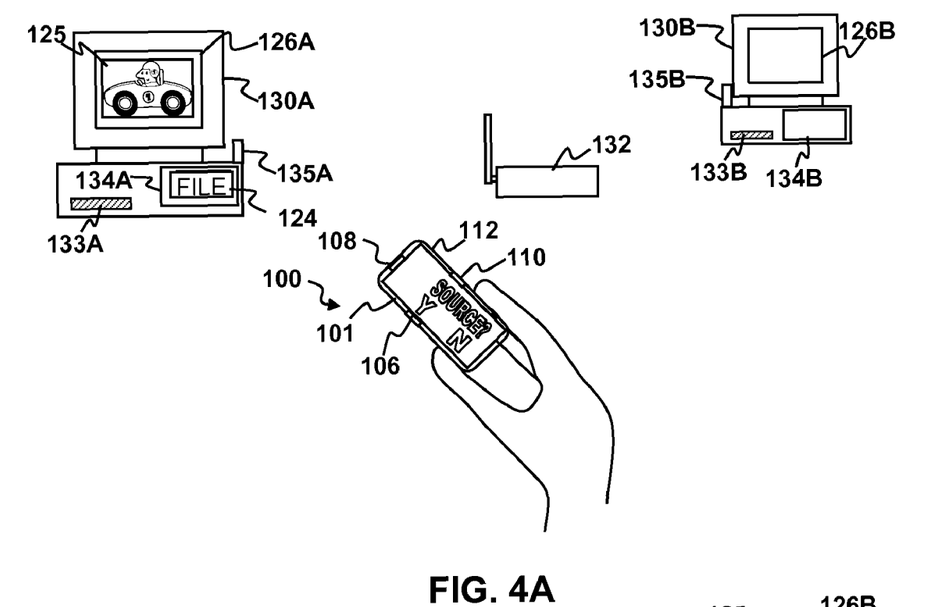
FIGS. 4A-4B are schematic diagrams illustrating file transfer with a hand-held electronic device according to an embodiment of the present invention.
Figure 4B:
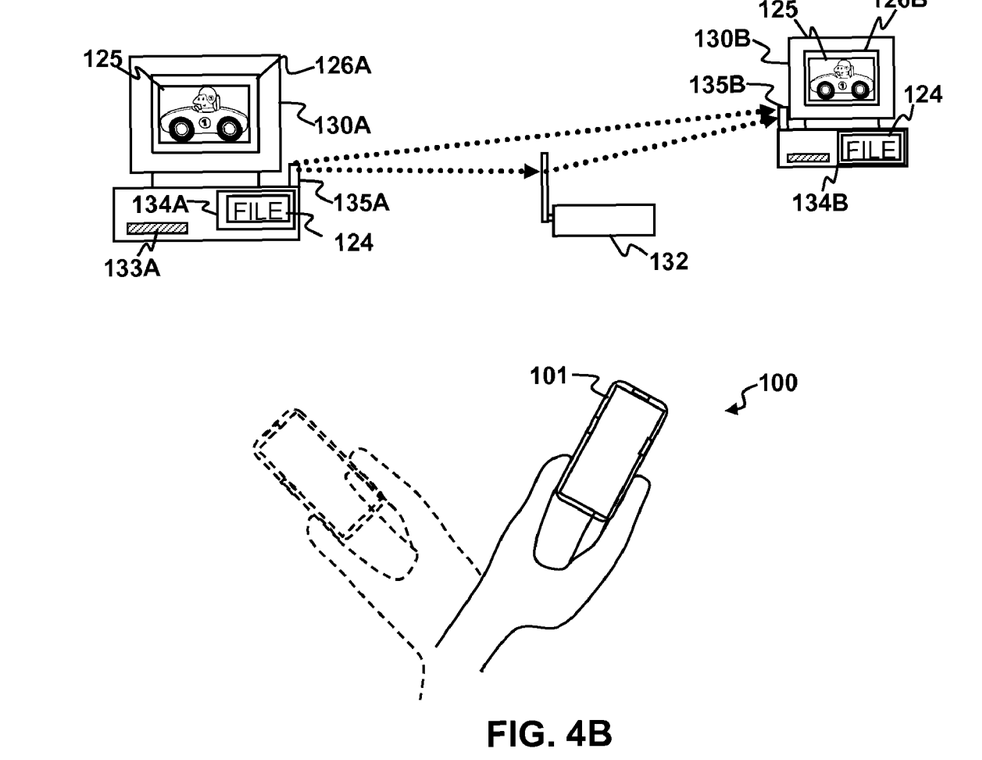

The flow diagram in FIG. 3 depicts an example of a file transfer method 300 that may be implemented using the device 100. Such a method may be implemented, in whole or in part through execution of the program instructions 114. Specifically, at 302 a file to be transferred from a source to a destination is identified. There are a number of different ways of selecting the file to be transferred. For example, the default selection may be a file associated with an image that is displayed on a screen associated with the source device. Alternatively, multiple files may be represented by images or icons displayed on the display screen. A particular file may be selected, e.g., by touching it, in the case of a touch screen.

The source and/or destination for the file may be identified using a signal generated by the remote device detector 108, as indicated at 304. The source and/or destination may be identified as indicated above. It is noted that the order of the operations indicated at 302 and 304 may be different from that indicated in FIG. 3. For example, if the file to be transferred is the file 125 stored in the memory 104 of the hand-held device 100, selecting the file and selecting the device may be thought of as occurring more or less simultaneously. Alternatively, if the file to be transferred is located on the remote device 130, it may be desirable to identify the remote device before selecting the file to be transferred.

Once the source, destination and file have been identified, the device 100 may recognize a gesture from a signal generated by the case motion sensor as a result of motion of the case 101 as indicated at 306. Gesture recognition may take place as described above. The file may then be transferred from the source to the destination in response to recognition of the gesture as indicated at 308. File transfer may take place as described above.

FIGS. 4A-4B pictorially illustrate an example of file transfer according to the method of FIG. 3. In this example, a file 124 stored in a memory 134A associated with a first remote device 130A is transferred to the memory 134B of a second remote device 130B using the hand-held device 100. In this example, the hand-held device 100 and the remote devices 130A, 130B can communicate with each other via a wireless router 132. The first remote device 130A may be selected as the source by pointing the hand-held device 100 at the first remote device 130A in such a way that the device detector can recognize a marker 133A on the first remote device and generate a signal in response to recognition of the marker 133A. By way of example, the marker 133A may be a bar code, RFID tag, or other marker described above. A user may confirm selection of the first remote device 130A by providing input to the remote device 100 in response to a query displayed on the screen 112 as seen in FIG. 4A. The second remote device 130B may be selected as the destination for the file 124 in a similar fashion, e.g., using a marker 133B on the second remote device 130B. Alternatively, the source and destination devices may be selected using a menu displayed on the screen 112 of the hand-held device 100.

Selection of the file 124 may take place by default as a result of selection of the first device 130A as the source. In particular, the device identification instructions 115 may be configured to automatically select the file 124 that is associated with an image 125 displayed on a screen 126A of the first remote device 130A. Alternatively, the file 124 may be selected from a menu displayed on the screen 112.

As shown in FIG. 4B, the file is transferred from the first remote device 130A in response to a flicking motion made with the case 101. The flicking motion may be recognized as a trigger to copy or move the file 124 from the first device 130A to the second device 130B. In the example shown in FIG. 4B, the file 124 is transferred from the first remote device 130A to the second remote device 130B via the router 132 and communication links 135A, 135B affiliated respectively with the first and second remote devices 130A, 130B. Alternatively, the file transfer may take place directly between the first and second remote devices 130A, 130B via the communication links 135A, 135B in the absence of a network. After the file 124 has been transferred, the image 125 may be displayed on a display 126B that is affiliated with the second remote device 130B. This may provide a visual cue that the file has been successfully transferred.

Embodiments of the present invention provide for quick and natural transfer of files among various electronic devices. Such file transfer may be implemented in an intuitive and entertaining fashion.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A hand-held electronic device, comprising:
    a case;
    a processor; a memory;
    a case motion sensor coupled to the processor;
    a remote device detector coupled to the processor; and
    a communication interface coupled to the memory and processor, wherein the communication interface is configured to facilitate transfer of data between the hand-held electronic device and a remote device, wherein the processor is programmed with instructions that, when executed cause the hand-held device to recognize a remote device from a signal generated by the remote device detector, recognize a gesture from a signal generated by the case motion sensor as a result of motion of the case; and transfer data with the communication interface from the hand-held device to the remote device or vice versa in response to recognition of the gesture.

2. The device of claim 1, further comprising a display screen disposed on a major surface of the case, wherein the display screen is coupled to the processor.

3. The device of claim 2 wherein the display screen is a touch screen.

4. The device of claim 2 wherein the instructions are configured to transfer data corresponding to an image displayed on the display screen.

5. The device of claim 1 wherein the hand-held device is configured to be used as game device, phone, portable media player, email device, web browser device or navigation device.

6. The device of claim 1, wherein the instructions are configured to select the remote device from among a plurality of remote devices proximate the hand-held device based on one or more remote device selection criteria.

7. The device of claim 1, wherein the instructions are configured to select the remote device from among a plurality of remote devices using an analysis of the motion of the case.

8. The device of claim 1 wherein the gesture includes a flicking motion made by flicking the case.

9. The device of claim 8, wherein the instructions are configured to determine a direction of the flicking motion and select the remote device from among a plurality of remote devices using a direction of the flicking motion.

10. The device of claim 1 wherein the communication interface is configured to communicate with the remote device via a network.

11. The device of claim 1 wherein the communication interface is configured to communicate directly with the remote device, even in the absence of a network.

12. A method for data transfer with a hand-held device having a processor; a memory, a case motion sensor coupled to the processor, a remote device detector coupled to the processor, and a communication interface coupled to the memory and processor, the method comprising:
    a) recognizing a remote device from a signal generated by the remote device detector;
    b) recognizing a gesture from a signal generated by the case motion sensor as a result of motion of the case; and
    c) transferring data with the communication interface from hand-held device to the remote device or vice versa in response to recognition of the gesture.

13. The method of claim 12 wherein c) includes transferring data corresponding to an image displayed on a display screen associated with the hand-held device.

14. The method of claim 12 wherein a) includes selecting the remote device from among a plurality of remote devices proximate the hand-held device based on one or more remote device selection criteria.

15. The method of claim 12 wherein a) includes analyzing the motion of the case and selecting the remote device based on a resulting analysis of the motion of the case.

16. The method of claim 12 wherein the gesture includes a flicking motion made by flicking the case.

17. The method of claim 12 wherein c) includes transferring the data from the memory to the remote device or vice versa via a network.

18. The method of claim 17 wherein the network includes a wireless network.

19. The method of claim 12 wherein c) includes transferring the data directly from the memory to the remote device or vice versa, even in the absence of a network.

20. The method of claim 12, further comprising selecting a file containing the data.

21. A method for data transfer with a hand-held device having a processor; a memory, a case motion sensor coupled to the processor, a remote device detector coupled to the processor, and a communication interface coupled to the memory and processor, the method comprising:
    a) identifying data to be transferred from a source to a destination;
    b) identifying the source and/or destination for the data using a signal generated by the remote device detector,
    c) recognizing a gesture using a signal generated by the case motion sensor as a result of motion of the case; and
    d) causing transfer of the data from the source to the destination in response to recognition of the gesture.

22. The method of claim 21 wherein a) includes selecting data associated with an image displayed on a screen associated with the source.

23. The method of claim 21 wherein b) includes selecting a remote device from among a plurality of remote devices proximate the hand-held device based on one or more remote device selection criteria.

24. The method of claim 23 wherein b) includes analyzing a motion of the case and selecting the remote device based on a resulting analysis of the motion of the case.

25. The method of claim 21 wherein b) includes selecting a remote device as the source using the signal generated by the remote device detector.

26. The method of claim 25 wherein b) further includes selecting the hand-held device as the destination.

27. The method of claim 21 wherein b) includes selecting a remote device as the destination using the signal generated by the remote device detector.

28. The method of claim 27 wherein b) further includes selecting the hand-held device as the source.

29. The method of claim 21 wherein b) includes
    i) selecting a first remote device as the source using a first signal generated by the remote device detector and ii) selecting a second remote device as the destination using a second signal generated by the remote device detector.

30. The method of claim 29 wherein the gesture includes a flicking motion made by flicking the case in a direction directed from the first remote device toward the second remote device.

31. The method of claim 21, further comprising, after d), displaying an image associated with the data on a display screen affiliated with the destination.

32. A hand-held electronic device, comprising:
a case;
a processor; a memory;
a case motion sensor coupled to the processor;
a remote device detector coupled to the processor; and
a communication interface coupled to the memory and processor, wherein the communication interface is configured to facilitate transfer of data stored in the memory between the memory and one or more remote devices,
wherein the processor is programmed with instructions that, when executed cause the device to identify data to be transferred from a source to a destination, identify the source and/or destination for the data using a signal generated by the remote device detector, recognize a gesture using a signal generated by the case motion sensor as a result of motion of the case, and cause transfer of the data from the source to the destination in response to recognition of the gesture.

* * * * *